(12) United States Patent
Weiss et al.

(10) Patent No.: US 8,263,733 B2
(45) Date of Patent: Sep. 11, 2012

(54) APPLICATION OF COIL TUBE EVAPORATORS FOR THE PRODUCTION OF POLYAMIDES

(75) Inventors: Robert Weiss, Kirchheim (DE); Jens Becker, Eisenberg (DE)

(73) Assignee: BASF SE, Ludwigshafen (DE)

( * ) Notice: Subject to any disclaimer, the term of this patent is extended or adjusted under 35 U.S.C. 154(b) by 567 days.

(21) Appl. No.: 12/446,274

(22) PCT Filed: Oct. 19, 2007

(86) PCT No.: PCT/EP2007/061187
§ 371 (c)(1),
(2), (4) Date: Apr. 20, 2009

(87) PCT Pub. No.: WO2008/049786
PCT Pub. Date: May 2, 2008

(65) Prior Publication Data
US 2010/0317810 A1    Dec. 16, 2010

(30) Foreign Application Priority Data
Oct. 24, 2006  (EP) .................................. 06122862

(51) Int. Cl.
*C08G 69/02*    (2006.01)
(52) U.S. Cl. ........ 528/310; 528/312; 528/323; 528/480; 528/486; 528/492
(58) Field of Classification Search .................. 528/310, 528/312, 323, 480, 486, 492
See application file for complete search history.

(56) References Cited

U.S. PATENT DOCUMENTS

| | | | |
|---|---|---|---|
| 5,703,204 A | 12/1997 | Gittinger et al. | |
| 5,962,538 A | 10/1999 | Wiltzer et al. | |
| 6,359,020 B1 * | 3/2002 | Mohrschladt | 521/49.8 |
| 6,548,626 B1 * | 4/2003 | Mohrschladt et al. | 528/310 |
| 2005/0022940 A1 | 2/2005 | Kupper et al. | |

FOREIGN PATENT DOCUMENTS

| | | |
|---|---|---|
| DE | 4321683 | 1/1995 |
| DE | 19925906 | 12/2000 |
| DE | 10335451 | 3/2005 |
| EP | 0284968 | 10/1988 |
| EP | 0459206 | 12/1991 |
| EP | 0847415 | 6/1998 |
| EP | 1058705 | 12/2000 |
| EP | 1194473 | 4/2002 |
| WO | WO-9501389 | 1/1995 |
| WO | WO-9708224 | 3/1997 |
| WO | WO-9910408 | 3/1999 |

* cited by examiner

*Primary Examiner* — Gregory Listvoyb
(74) *Attorney, Agent, or Firm* — Connolly Bove Lodge & Hutz LLP

(57) ABSTRACT

Helical tube evaporators are used to concentrate aqueous extract solutions from the extraction of polyamides based on polyamide 6.

A process for preparing polyamides based on polyamide 6 comprises the stages of b) monophasic or biphasic reaction of aqueous extract solutions from the extraction of polyamides based on polyamide 6, which may be enriched with caprolactam, aminocapronitrile, aminocaproic acid or mixtures thereof, in a prereactor at pressures in the range from 5 to 40 bar and temperatures in the range from 150 to 300° C., the gaseous phase formed being removable from the liquid phase in the case of the biphasic reaction, c) discharge of the reaction mixture from stage b) through a helical tube evaporator at a temperature in the range from 220 to 300° C. with pressure reduction to about atmospheric pressure and removal of a gaseous phase to obtain a liquid phase, d) further reaction of the liquid phase from stage c) at temperatures in the range from 240 to 300° C. and pressures in the range from atmospheric pressure to 2 bar with removal of a gaseous phase.

20 Claims, No Drawings

APPLICATION OF COIL TUBE EVAPORATORS FOR THE PRODUCTION OF POLYAMIDES

CROSS REFERENCE TO RELATED APPLICATIONS

This application is a National Stage of PCT/EP2007/061187 filed Oct. 19, 2007 which in turn claims priority from European Application 06122862.3 filed Oct. 24, 2006, the entire contents of which are incorporated herein by reference.

The invention relates to the use of helical tube evaporators in the preparation of polyamides and to processes for preparing polyamides based on polyamide 6.

it is known that a temperature-dependent equilibrium which leads to a water-soluble proportion of the end product typically in the range from 10 to 13% is established in the polymerization of, for example, caprolactam to polyamide 6 (PA6). This unconverted proportion has to be removed from the polyamide before it can be processed further.

Typically, the removal is effected by extraction with water. The extraction water then has to be thickened again. For economic reasons it is preferred to introduce the organic fraction back into the production process.

EP-B-0 847 415 relates to a process for continuously preparing polyamide 6 using recycled lactam. In the described preparation of polyamide 6 using recycled lactam, the recycled lactam is processed further with oligomers dissolved in the lactam by introducing the recycled lactam into a closed system with addition of fresh lactam, and treating it under pressure by hydrolysis at water contents of from 3 to 15% and temperatures in the range from 220 to 280° C. in the molten liquid phase. A process having four stages overall is described, the concentration being effected by means of a heat exchanger and a control valve. In order to prevent the precipitation of oligomers or dimers, the organic phases have to be kept constantly at relatively high temperatures of more than 120° C. The long residence time at high temperature leads, however, frequently to losses in the end product quality. For instance, the color number (APHA) can increase, and the content of volatile bases can likewise increase. This phenomenon is particularly critical especially when the extract water still comprises inorganic components, as occur in the extraction of pigmented polymers.

In addition, the reaction mixture has to be present in monophasic liquid in the hydrolysis, which means a high level of control complexity. Moreover, the extract water has to be very highly concentrated in preceding process steps because relatively large amounts of water cannot be removed sufficiently in the further course of the process. However, highly concentrated extract water has an extremely high tendency to form deposits in the system. Especially in the case of use of customary heat exchangers, such as plat heat exchangers or falling-film evaporators, there is frequently formation of deposits which have to be removed from time to time. This phenomenon is particularly critical especially when the extract water also comprises inorganic components, for example derived from Si, P, Mn, Sb or Ti, as obtained in the extraction of pigmented polymers. The process thus appears, from a process technology point of view, to be troublesome, uneconomic and unsuitable for the preparation of products with low color number and low total ash content.

EP-B-1 194 473 relates to a process for preparing polyamides from lactams and polyamide extracts. The reaction is performed in the presence of metal oxides, beta-zeolites, sheet silicates or silica gels, which may be doped, as heterogeneous catalysts. Heterogeneous catalysts are used in a form which allows mechanical removal from the reaction mixture, and they are removed from the reaction mixture in the course of or after the end of polymerization. The water content of the reaction mixture is from 0.5 to 13% by weight, it is possible, for example, to work in a first stage at a temperature in the range from 170 to 310° C. and a pressure in the range from 5 to 40 bar, while adiabatic decompression is effected in the second stage, with water and any lactam monomers and oligomers being discharged by flash evaporations.

EP-B-1 058 705 relates to a process for preparing polyamides by polymerizing lactams in the presence of metal oxides as heterogeneous catalysts. The metal oxides are used in turn in the form of granules, extrudates, fixed beds or catalyst-coated random packings or internals, which allow mechanical removal from the reaction mixture. They are removed from the reaction mixture in the course of or after the end of the polymerization. The water content of the reactant mixture is more preferably from 0.005 to 1% by weight. The reaction mixture can also be converted in 3 phases. In this case, a first high-pressure phase in which the reactants are present in monophasic liquid form is followed by a biphasic high-pressure phase in an open reactor, which enables the removal of condensation products. In a third, low-pressure phase, the desired degree of polymerization is finally attained by postcondensation and efficient water removal.

It is an object of the present invention to provide a process for preparing polyamides based on polyamide 6 proceeding from aqueous extract solutions from the extraction of polyamides based on polyamide 6, while avoiding the disadvantages of the known processes. In particular, a continuous process shall be provided in which the solution viscosity (RV) of the polyamide is greater than 1.7, and in which the polyamides are granulable with the aid of underwater granulation. Moreover, the polyamides prepared should have very good polymeric characteristics, such as a low Si content, a balanced end group equivalence in which the ratio of amino end groups to carboxyl end groups (AEG/CEG) is preferably not greater than 1.25. The products should preferably have low intrinsic color and a low content of volatile bases.

The object is achieved in accordance with the invention by using helical tube evaporators for concentrating aqueous extract solutions from the extraction of polyamides based on polyamide 6.

The object is further achieved by a process for preparing polyamides based on polyamide 6, comprising the stages of
b) monophasic or biphasic reaction of aqueous extract solutions from the extraction of polyamides based on polyamide 6, which may be enriched with caprolactam, aminocapronitrile, aminocaproic acid or mixtures thereof, in a prereactor at pressures in the range from 5 to 40 bar and temperatures in the range from 150 to 300° C., the gaseous phase formed being removable from the liquid phase in the case of the biphasic reaction,
c) discharge of the reaction mixture from stage b) through a helical tube evaporator at a temperature in the range from 220 to 300° C. with pressure reduction to about atmospheric pressure and removal of a gaseous phase to obtain a liquid phase,
d) further reaction of the liquid phase from stage c) at temperatures in the range from 240 to 300° C. and pressures in the range from atmospheric pressure to 2 bar with removal of a gaseous phase.

It has been found in accordance with the invention that helical tube evaporators can be used advantageously for the conversion and concentration of aqueous extract solutions from the extraction of polyamides based on polyamide 6 to achieve very high concentrations. Preferably, end concentrations of at least 90% by weight, in particular at least 95% by weight, are achieved. It is also possible to concentrate aqueous extract solutions which comprise pigments without there being any deposition or sediment formation by the pigments, which would necessitate mechanical cleaning of the evaporator at regular intervals.

The helical tube evaporator is in particular a jacketed tube in which a heating medium is conducted within the heating jacket and serves for temperature control. Industrial jacketed tubes which are used with preference in accordance with the invention have a length in the range from 20 to 70 m, more preferably from 40 to 50 m, and they have an internal diameter of preferably from 3 to 20 cm, in particular from 5 to 10 cm. In the inventive aqueous extract, the helical tube evaporator causes water evaporation, so that there is an expansion in volume. In the process according to the invention, the reaction pressure is continuously reduced over the helical tubs evaporator. Typically, in the downstream region of the helical tube evaporator, a core flow by gas (steam) is present, while a wall film is present as a liquid phase. If required, an inert gas can be metered in at the inlet or "top" of the helical tube, for example steam, $N_2$, Ar, $CO_2$ or gas mixtures comprising them, for example 16 bar steam, in order to generate or to enhance the core stream. This may be required, for example, when insufficient water is present in the organic phase, for example at concentrations above 98%. The added gas then serves as a carrier gas. At the end of the helical tube evaporator, there is typically a phase separation between vapor phase and liquid phase. The core flow by the gas may, for example, make up, based on the cross-sectional area of the helical tube, an area proportion of from 15 to 35%, in particular about 25%, while the wall film, i.e. the liquid phase, may make up from 65 to 85%, in particular about 75%, of the cross-sectional area. In the process according to the invention, the helical tube evaporator may serve as a valve, since a high pressure, for example 20 bar, is present at the evaporator inlet, while about atmospheric pressure exists at the outlet of the reactor. The pressure is thus reduced continuously over the length of the helical tube.

Helical tube evaporators are known, for example, from the separation of organic mixtures into low and high boilers.

In the context or the present invention, polyamides based on polyamide 6 are those polyamides or copolyamides which, based on the monomer base units, have at least 60% polyamide 6 base units, they may be termed, for example, from caprolactam, aminocapronitrile, aminocaproic acid or mixtures thereof. Possible copolyamide units may derive, for example, from dicarboxylic acids and diamines, as is the case especially for polyamide 66. The proportion of comonomers is preferably not more than 40% by weight, more preferably not more than 20% by weight, in particular not more than 10% by weight, based on the copolyamide. Particular preference is given to working with pure polyamide 6 which does not comprise any comonomers in the structure, but rather has, if appropriate, chain regulators or light stabilizers in its structure.

Polyamide 6 or polyamide 6 copolyamides are typically, after the preparation, extracted with water, frequently hot water. The aqueous extract solutions obtained comprise, depending on the starting monomer in the polyamide preparation, for example in a preparation proceeding from caprolactam, about 80% by weight of caprolactam and about 20% by weight of dimers, trimers and higher oligomers of caprolactam in aqueous solution. The extract content is frequently from 5 to 15% by weight, particularly frequently from 10 to 13% by weight. This extract wafer or aqueous extract solutions are, in accordance with the invention, used for polyamide preparation, a concentration being effected in helical tube evaporators. The concentration in the helical tube evaporator may be preceded by a further concentration. The first concentration may lead, for example, to 60 to 80% by weight solutions, especially to about 70% by weight solutions. These solutions are then concentrated in the helical tube evaporator to an end concentration of preferably at least 90% by weight, more preferably at least 95% by weight. It is also possible to use extract water of pigmented polyamides which comprise inorganic components. Examples of inorganic components derive from Si, P, Mn, Sb or Ti. For example, $TiO_2$ may be present in the polyamides and, after the extraction, also in the extract waters. Such pigment-containing extract water would, in the case of falling-film evaporators, lead to conglutination of the heat exchange areas, which significantly worsens the evaporation properties. A failure of the evaporator and the necessity of frequent cleanings would be the consequence.

In contrast, for example, to a falling-film evaporator, high flow rates are present in the helical tube evaporator, since a lot of vapor is formed, especially at temperatures in the range from 220 to 300° C. The high formation of vapor leads to very short residence times and to self-cleaning of the helical tube. The problems known from falling-film evaporators can therefore be avoided.

It is possible in accordance with the invention, before the concentration of the aqueous extract solutions, to add to them fresh monomers, for example caprolactam, aminocapronitrile or aminocaproic acid. Preference is given to adding fresh lactam. The addition of caprolactam can help to keep the oligomers in solution.

The process according to the invention comprises at least 3 stages or steps. In the first stage b), the monophasic or biphasic reaction of aqueous extract solutions from the extraction of polyamides based on polyamide 6, which may be enriched with caprolactam, aminocapronitrile, aminocaproic acid or mixtures thereof, is effected in a prereactor at pressures in the range from 5 to 40 bar and temperatures in the range from 150 to 300° C. In a biphasic reaction, the gaseous phase formed may be removed from the liquid phase. Preferred pressures are in the range from 10 to 30 bar, preferred temperatures being in the range from 180 to 240° C. Particular preference is given to performing stage b) at a pressure of from about 18 to 22 bar.

The aqueous extract solutions may preferably be present in a concentration of from 10 to 80% by weight, in particular from 40 to 75% by weight. Depending on the pressure and temperature conditions selected, a liquid phase, or a liquid phase and a gas phase (biphasic) forms. In this stage, a cleavage of the oligomers is performed with the use of water. It may be advantageous in accordance with the invention to add, for example, fresh lactam in this stage. The addition of pigments is also possible. In the case of enrichment with caprolactam, aminocapronitrile, aminocaproic acid or mixtures thereof, the added proportion, based on the proportion already contained in the mixture, is preferably not more than 60%, more preferably not more than 30%, in particular not more than 15%. In pigmented polyamides based on polyamide 6, the pigment content is preferably from 0.03 to 3% by weight, in particular from 0.3 to 2% by weight, based on the overall polyamide. In the process according to the invention, it is therefore possible to introduce an appropriate pigment content actually at the start of the first reaction. The admixing of the pigments in one of the further reaction stages is also possible.

In stage c), the reaction mixture from stage b) is discharged through a helical tube evaporator at a temperature in the range from 220 to 300° C. with pressure reduction to about atmospheric pressure and removal of a gaseous phase to obtain a liquid phase. The decompression of the reaction mixtures to about atmospheric pressure is thus effected by conducting it through the helical tube. Blockage of the helical tube is reliably prevented owing to the high flow rates. The gaseous phase comprises quite predominantly steam and is removed downstream of the exit from the helical tube evaporator, in addition, a melt is obtained at a temperature of from 220 to 300° C., preferably from 220 to 260° C. The vapor phase can be removed, for example, via a column, and the column may be water-flushed.

The expression "about atmospheric pressure" describes atmospheric pressure with deviations by from −0.5 to +1 bar, in particular ±0.5 bar.

The liquid phase is subsequently, in stage d), reacted further at temperatures in the range from 240 to 300° C., preferably from 250 to 280° C., and pressures in the range from atmospheric pressure to 2 bar, in particular from atmospheric to 1.3 bar, with removal of a gaseous phase. This further reaction can also be understood as a postcondensation/postpolymerization.

According to the invention, it is possible in the present process to insert a further stage a) at the start, in which a preevaporation of the aqueous extract solutions from the extraction of polyamides based on polyamide 6 for concentration to a concentration in the range from 60 to 80% by weight, more preferably from 70 to 80% by weight, in particular about 75% by weight, is performed. This preevaporation can be performed, for example, with customary evaporators, such as falling-film evaporators.

The process according to the invention can be performed batchwise or preferably continuously. The reaction in stage d) is performed preferably in a VK tube. The VK tube is a tubular reactor flowed through continuously. Suitable reactors are known to those skilled in the art. Preferably, in stage c), the aqueous extract solution is concentrated to more than 90% by weight, more preferably to at least 95% by weight.

In this connection, all data in % by weight refer to the complete extract solution. A 90% by weight solution thus has a water content of 10% by weight and an (anhydrous) extract content of 90% by weight.

Stage d) can be followed by a further stage e) in which a granulation of the polyamides based on polyamide 6 is effected. The granulation can be performed, for example, as an underwater granulation. Suitable processes are known to those skilled in the art.

The granulation is typically followed by an extraction, and the resulting extract water can be recycled into the inventive reaction.

Before the feeding of the aqueous extract solutions into stage b), they can be heated continuously with the aid of a heat exchanger. The reaction in stage d) can be performed, for example, in a reactor flowed through continuously, which may, if desired, comprise internals such as Sulzer mixing elements in order to prevent backmixing.

In the preparation of copolyamides, it is possible, for example, also to use dicarboxylic acids, diamines or salts of dicarboxylic acids and diamines. Suitable dicarboxylic acids are, for example, aliphatic $C_{4-10}$-α,ω-dicarboxylic acids such as succinic acid, glutaric acid, adipic acid, pimelic acid suberic acid, acelaic acid, sebacic acid, preferably adipic acid and sebacic acid, more preferably adipic acid. It is also possible to use aromatic $C_{8-20}$-dicarboxylic acids such as terephthalic acid.

The α,ω-diamines having from 4 to 10 carbon atoms used may be tetramethylenediamine, pentamethylenediamine, hexamethylenediamine, heptamethylenediamine, octamethylenediamine, nonamethylenediamine and decamethylenediamine, particular preference being given to hexamethylenediamine.

Among the suitable salts of the dicarboxylic acids and diamines mentioned, preference is given in particular to the salt of adipic acid and hexamethylenediamine, so-called AH salt.

In a continuous process, the residence time in different stages may depend upon the conversion and also upon the use of a catalyst. The residence time may, for example, be from 10 to 120 minutes in stage b), from 0.1 to 30 minutes in stage c), and from 6 to 20 hours in stage d). Preference is given to a residence time in the range from 20 to 90 minutes for stage b), to a residence time in the range from 1 to 10 minutes for stage c), and to a residence time of from 8 to 15 hours for stage d). According to the invention, the wafer content in the reaction mixture is adjusted such that, on the one hand, the entrained water is dissociated virtually quantitatively from the organic product stream, but, on the other hand, sufficient water remains in the organic phase to conduct the polymerization reaction to the desired viscosity.

When monomers are also removed with the gas and vapor phase in the process according to the invention, they may be removed with the aid of distillation columns and recycled into the reaction.

It is also possible to drive any water present out of the liquid phase by means of an inert gas such as nitrogen.

The residence time of the reaction mixture in stage d) is guided primarily by the desired relative viscosity of the polyamide to be prepared and the selective temperature. For example, use of a mixture of caprolactam, oligomer and water with 12 hours of residence time and a temperature in the range from 250 to 270° C. afford a polyamide 6 having a relative viscosity of 2.2, while 24 hours of residence time under otherwise identical conditions can give a relative viscosity of 2.7. The viscosity is always determined at a temperature of 25° C. and a concentration of 1 g of polymer per 100 ml in 96% by weight sulfuric acid.

The reaction effluent can be discharged from stage d), for example, with the aid of a pump. A subsequent workup can be performed as described, for example, in DE-A-43 21 683. Reference is made in particular to page 3 line 54 to page 4 line 3 of this document. Particular preference is given to underwater granulation.

It is possible in accordance with the invention to reduce the content of cyclic dimer in the polyamide 6 further by extracting the polyamide first with an aqueous solution of caprolactam and then with water, or subjecting it to a gas phase extraction, as described, for example, in EP-A-0 284 968.

It is additionally possible in accordance with the invention to add customary additives and fillers, such as pigments, especially titanium dioxide (anatase and/or rutile), silicon dioxide and lime, chain regulators such as aliphatic and aromatic carboxylic and dicarboxylic acids such as propionic acid, acetic acid, benzoic acid, terephthalic acid and triacetonediamine, stabilizers such as copper(I) halides and alkali metal halides, nucleating agents such as magnesium silicate or boron nitride, catalysts such as phosphorous acid, and also antioxidants, in amounts in the range of, for example, from 0.01 to 5% by weight, more preferably from 0.2 to 2% by weight, based on the amount of monomers used. Suitable catalysts are described, for example, in EP-B-1 194 473.

The polyamides obtained in accordance with the invention can be used to produce fibers, films and materials.

The invention is illustrated below in detail with the aid of examples.

EXAMPLES

The amino end groups and carboxyl end groups (AEG and CEG) were determined by the method described in WO 95/01389, page 6 line 35 to page 7 line 40.

The relative viscosity (RV) was determined at a temperature of 25° C. and a concentration of 1 g of polymer per 100 ml in 96% by weight sulfuric acid.

The table below states the experimental conditions for stage b) and c). In stage c), reaction was effected in a helical tube. The postcondensation in stage d) was performed at a temperature of 260° C., a pressure of 200 mbar and a residence time of 12 hours. The residence time was from about 10 to 30 minutes in stage b), and about 1 minute in stage c).

In the table below, PAW relates to the concentration of the extracts of polyamide 6 which has been prepared using caprolactam. The color deviation db indicates the degree of yellowing. The results are compiled in the table below.

| | Process parameter | | | | | | Product properties after stage 3 | | | | | | |
|---|---|---|---|---|---|---|---|---|---|---|---|---|---|
| Example | Concentrated extract, 75% strength PAW % | Conductivity µS/cm | Si content PAW ppm | Stage 1 Bar | Stage 1° C. | Stage 2° C. | RV | Extract | APHA | Color deviation measure of yellowing dB | Si content ppm | AEG mmol/kg | CEG mmol/kg |
| 1 | 75 | — | 10 | 15 | 230 | 215 | 2.21 | 12 | 1 | 2.6 | 1 | 55 | 43 |
| 2 | 75 | — | 0 | 15 | 222 | 253 | 2.27 | 11 | 2 | 2.4 | 0 | 52 | 56 |
| 3 | 80 | 100 | — | 13 | 220 | 225 | 2.25 | 10 | 1 | — | 1 | 52 | 68 |
| 4 | 70 | 80 | 5 | 18 | 225 | 210 | 2.19 | 12 | 1 | — | 1 | 60 | 50 |

Stage 1: Typical residence times 10 min-30 min
Stage 2: helical tube: sec-min; approx. 1 minute

The invention claimed is:

1. A process for preparing polyamides based on polyamide 6, comprising the stages of
   b) monophasic or biphasic reaction of aqueous extract solutions from the extraction of polyamides based on polyamide 6, which may be enriched with caprolactam, aminocapronitrile, aminocaproic acid or mixtures thereof, in a prereactor at pressures in the range from 5 to 40 bar and temperatures in the range from 150 to 300° C., the gaseous phase formed being removable from the liquid phase in the case of the biphasic reaction,
   c) discharge of the reaction mixture from stage b) through a helical tube evaporator at a temperature in the range from 220 to 300° C. with pressure reduction to about atmospheric pressure and removal of a gaseous phase to obtain a liquid phase,
   d) further reaction of the liquid phase from stage c) at temperatures in the range from 240 to 300° C. and pressures in the range from atmospheric pressure to 2 bar with removal of a gaseous phase.

2. The process according to claim 1, wherein the preparation is effected continuously.

3. The process according to claim 2, wherein the reaction in stage d) is performed in a VK tube.

4. The process according to claim 1, wherein the aqueous extract solution is concentrated in stage c) to more than 90% by weight.

5. The process according to claim 1, wherein, before stage b), a preevaporation of aqueous extracts from the extraction of polyamides based on polyamide 6 is performed in a stage a) for concentration to a concentration in the range from 60 to 80% by weight.

6. The process according to claim 1, wherein, after stage d), the polyamides based on polyamide 6 are granulated in a stage e).

7. The process according to claim 1, wherein a carrier gas is added in stage c).

8. The process according to claim 2, wherein the aqueous extract solution is concentrated in stage c) to more than 90% by weight.

9. The process according to claim 3, wherein the aqueous extract solution is concentrated in stage c) to more than 90% by weight.

10. The process according to claim 2, wherein, before stage b), a preevaporation of aqueous extracts from the extraction of polyamides based on polyamide 6 is performed in a stage a) for concentration to a concentration in the range from 60 to 80% by weight.

11. The process according to claim 3, wherein, before stage b), a preevaporation of aqueous extracts from the extraction of polyamides based on polyamide 6 is performed in a stage a) for concentration to a concentration in the range from 60 to 80% by weight.

12. The process according to claim 4, wherein, before stage b), a preevaporation of aqueous extracts from the extraction of polyamides based on polyamide 6 is performed in a stage a) for concentration to a concentration in the range from 60 to 80% by weight.

13. The process according to claim 2, wherein, after stage d), the polyamides based on polyamide 6 are granulated in a stage e).

14. The process according to claim 3, wherein, after stage d), the polyamides based on polyamide 6 are granulated in a stage e).

15. The process according to claim 4, wherein, after stage d), the polyamides based on polyamide 6 are granulated in a stage e).

16. The process according to claim 5, wherein, after stage d), the polyamides based on polyamide 6 are granulated in a stage e).

17. The process according to claim 2, wherein a carrier gas is added in stage c).

18. The process according to claim 3, wherein a carrier gas is added in stage c).

19. The process according to claim 4, wherein a carrier gas is added in stage c).

20. The process according to claim 5, wherein a carrier gas is added in stage c).

* * * * *